(12) United States Patent
Paik et al.

(10) Patent No.: US 6,501,460 B1
(45) Date of Patent: Dec. 31, 2002

(54) LIGHT-RECEIVING UNIT FOR OPTICAL MOUSE AND OPTICAL MOUSE HAVING THE SAME

(75) Inventors: Joon-Ki Paik, Suwon (KR); Dong-Hoon Kang, Seoul (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 0 days.

(21) Appl. No.: 09/991,700

(22) Filed: Nov. 26, 2001

(30) Foreign Application Priority Data

Sep. 5, 2001 (KR) .............................................. 01-54528

(51) Int. Cl.$^7$ ................................................. G09G 5/08
(52) U.S. Cl. ....................................... 345/163; 345/166
(58) Field of Search ................................. 345/163, 166, 345/175; 250/221; 178/18.09; 382/312, 313, 314, 321; 358/473, 488

(56) References Cited

U.S. PATENT DOCUMENTS

| | | | | |
|---|---|---|---|---|
| 4,751,505 A | * | 6/1988 | Williams et al. | ............ 345/166 |
| 4,799,055 A | * | 1/1989 | Nestler et al. | ............... 345/166 |
| 4,804,949 A | * | 2/1989 | Faulkerson | .................. 345/166 |
| 5,086,197 A | * | 2/1992 | Liou | ........................... 345/166 |
| 5,517,211 A | * | 5/1996 | Kwang-Chien | ............. 345/166 |

* cited by examiner

*Primary Examiner*—Regina Liang
(74) *Attorney, Agent, or Firm*—Morgan, Lewis & Bockius LLP

(57) ABSTRACT

A light-receiving unit which is simplified by dispensing with a case or a lens and thus improved in manufacturing efficiency and lowered in manufacturing cost is disclosed. The light-receiving unit comprises: a lens for converging light, which is emitted from a light source and then reflected from a contacting object, in which the light carries an image formed on the contacting object; a printed circuit board having a light hole for allowing the light converged by the lens to be passed therethrough; and a molding package made by molding lead frames electrically connected to the printed circuit board and an optical sensor bonded to the lead frames with transparent resin, which is adapted to detect the image carried in the converged light.

12 Claims, 2 Drawing Sheets

LIGHT-RECEIVING UNIT FOR OPTICAL MOUSE AND OPTICAL MOUSE HAVING THE SAME

BACKGROUND OF THE INVENTION

1. Field of the Invention

The present invention relates to a light-receiving unit for an optical mouse, and more particularly, to a light-receiving unit for an optical mouse in which lead frames and an optical sensor are integrally molded with transparent resin.

2. Description of the Prior Art

In general, an optical mouse is designed to detect movement of an image carried in light reflected from a mouse pad having the image thereon and received therein, thereby causing a cursor on an associated display screen to be moved in accordance with the movement of the mouse, and to enable several functional signals to be inputted to a computer system by clicking of buttons equipped thereon, separately from a keyboard unit.

Since such an optical mouse has advantages of the accuracy of its motion detection, and smoothness in its motion, as compared with the prior art ball-type mouse, its use is gradually increasing.

An optical mouse is adapted to cause a cursor on a display screen to be moved, by optically detecting its own motion, converting the detected value to an electrical signal, and sending the signal to a computer.

Referring to FIG. 1, there is shown a typical optical mouse. Such an optical mouse 10 comprises a light source 12 for emitting light into a casing 11, a light-receiving unit for detecting an image formed on a mouse pad due to the light emitted thereto, an operating unit for converting the signal detected by the light-receiving unit to an electrical signal and then sending the signal to a computer, and buttons 18 for clicking by a user. In general, the light source 12 includes a high luminance LED for irradiating a bright light to a pad surface.

The light-receiving unit comprises a lens 13 for converging light emitted from the light source 12 and reflected from the mouse pad/contacting surface and carrying an image formed on the surface, an optical sensor array 16 for detecting movement of the converged image, and lead frames 19 adapted to be electrically connected between the optical sensor array 16 and a printed circuit board 14 and to support the optical sensor 16.

The prior art optical mouse has been fabricated in such a way that an integrated circuit chip 15 having the optical sensor array 16 therein is made into a package type and then built in a case, and the case is mounted on the printed circuit board 14.

FIG. 2 shows a conventional light-receiving unit for an optical mouse. As shown in the drawing, in a fabricating operation of a conventional light-receiving unit for an optical mouse, an integrated circuit chip 150 having an optical sensor 160 is bonded to lead frames 170 by using a wire bonding procedure, and then transparent resin 190 is applied thereto. The integrated circuit chip applied with the resin is covered with a cap 180 having a slit 181 for allowing a converged image to be passed therethrough, resulting in a full package type integrated circuit chip. The full package type IC chip is mounted on a printed circuit board 100.

As again shown in FIG. 2, in a configuration of the light-receiving unit wherein IC chip package is mounted on the printed circuit board 100, the IC chip 150 is disposed over the printed circuit board 100 and electrically connected thereto by means of the lead frames 170. The printed circuit board 100 is formed with an optical guide 101 for guiding an image formed on a mouse pad. A lens 130 adapted to converge the image is positioned in a light path under the light guide 101.

The above-mentioned conventional light-receiving unit for an optical mouse has disadvantages in that a full package type IC chip must be mounted on a printed circuit board in order to connect the printed circuit board to the IC chip, and a case for protecting the full package type IC chip must be prepared, thereby increasing its manufacturing cost and lowering its productivity.

SUMMARY OF THE INVENTION

Accordingly, the present invention has been made keeping in mind the above problems occurring in the prior art, and an object of the present invention is to provide a light-receiving unit for an optical mouse which is integrally fabricated by molding lead frames and an optical sensor with transparent resin.

It is another object of the invention to provide a light-receiving unit for an optical mouse which is simplified by integration of the associated components, is improved in manufacturing efficiency, and is lowered in manufacturing cost.

It is a further object of the invention to provide a light-receiving unit for an optical mouse which is reduced in the number of its components such as a cap, a lens, etc. by integrating lead frames, an optical sensor or a lens into a molding package, thereby decreasing mold cost and improving productivity.

In order to accomplish the above object, the present invention provides a light-receiving unit for an optical mouse comprising: a lens for converging light, which is emitted from a light source and then reflected from a contacting object, in which the light carries an image formed on the contacting object; a printed circuit board having a light hole for allowing the light converged by the lens to be passed therethrough; and a molding package made by molding lead frames electrically connected to the printed circuit board and an optical sensor bonded to the lead frames with transparent resin, which is adapted to detect the image carried in the converged light.

The present invention also provides a light-receiving unit for an optical mouse comprising: a printed circuit board having a light hole for allowing converging light, which is emitted from a light source and then reflected from a contacting object, to be passed therethrough, in which the light carrys an image formed on the contacting object; and a molding package made by molding lead frame electrically connected to the printed circuit board and an optical sensor bonded to the lead frames and adapted to detect the image carried in the converged light with transparent resin; wherein the transparent resin is provided at its bottom surface with a slit/lens area for allowing the converged light to be passed therethrough and a mask area for preventing the converged light from passing therethrough.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
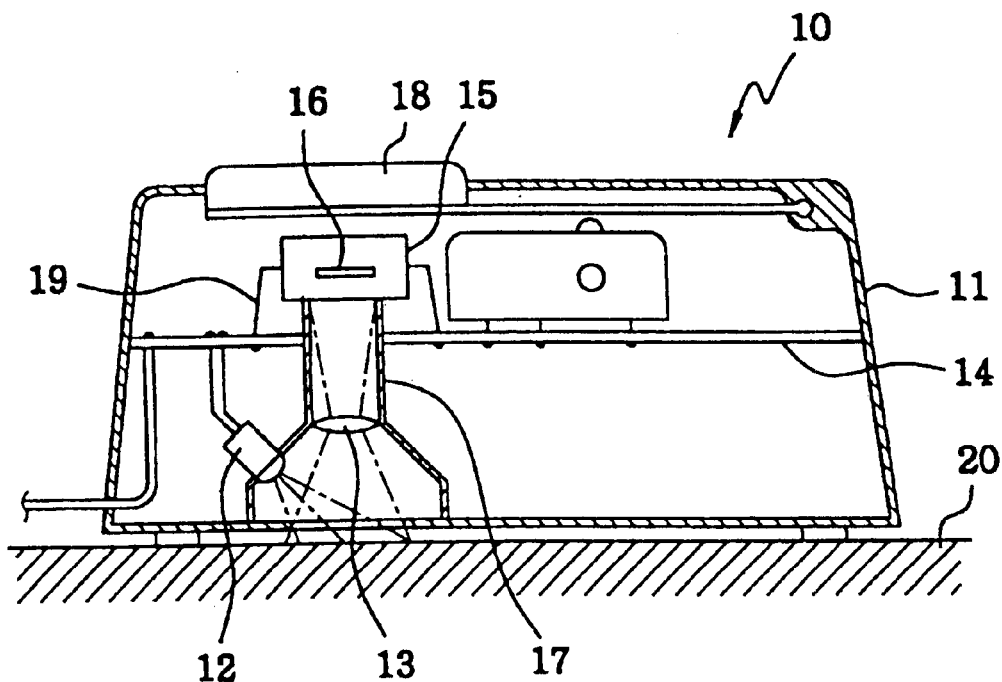
FIG. 1 is a cross-sectional view showing a typical optical mouse.

Reference now should be made to the drawings, in which the same reference numerals are used throughout the different drawings to designate the same or similar components.

While the conventional light-receiving unit for an optical mouse is usually fabricated in such a way that an IC chip package including an optical sensor which is bonded to lead frames by using a wire bonding procedure is mounted on a printed circuit board, a light-receiving unit according to the present invention is integrated by molding an optical sensor, lead frames or a lens with transparent resin.

Figure 3:
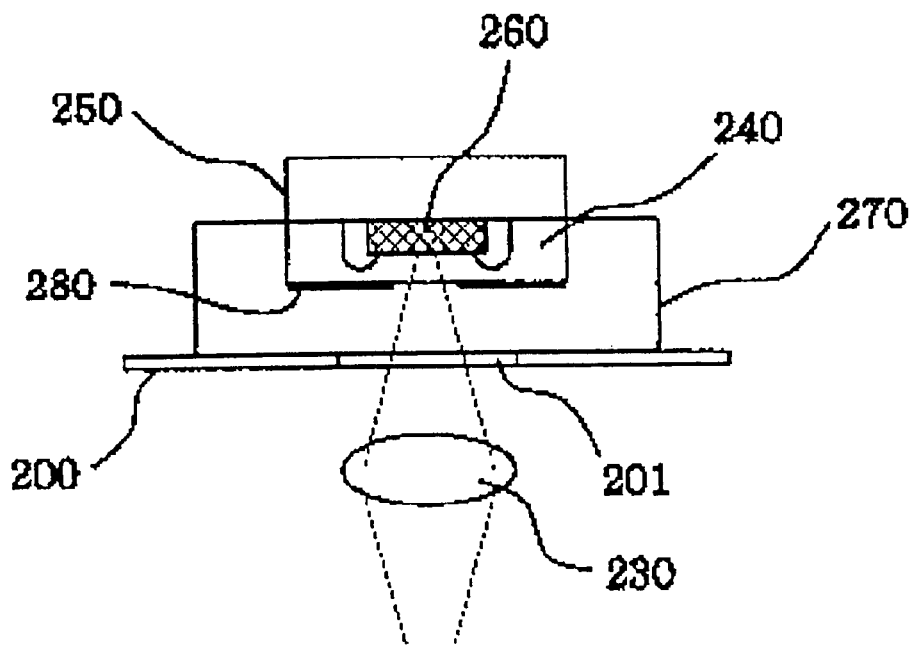
FIG. 3 is a cross-sectional view schematically showing a light-receiving unit according to an embodiment of the present invention.

FIG. 3 shows a light-receiving unit for an optical mouse according to an embodiment of the present invention.

As shown in the drawing, the light-receiving unit of the invention is fabricated in such a way that an optical sensor 260 is bonded to lead frames 270 by using a wire bonding technique, and the lead frames and the optical sensor bonded thereto are integrally molded into a molding package 250 with transparent resin 240. The lead frames 270 are electrically connected to a printed circuit board 200, and the printed circuit board 200 is formed with a light hole 201 for allowing a converged image to be passed therethrough. Under the printed circuit board 200 is provided a lens 230 capable of converging an image formed on a mouse pad, as with the conventional optical mouse. The lens 230 may include spherical lenses and aspherical lenses which are capable of converging an image from the mouse pad.

According to the above-mentioned light-receiving unit, since the invention eliminates a necessity for applying an optical sensor with transparent resin and then attaching a cap to the molded transparent resin, the light-receiving unit of the present invention has an arrangement which is much simpler than that of the prior art.

With the arrangement of the light-receiving unit according to the present invention, light carrying an image formed on a mouse pad is converged by the lens 230, and the converged light reaches the optical sensor 260 via the light hole 201 formed at the printed circuit board 200 and the molded transparent resin 240. The bottom of the molding package, which is molded with the transparent resin, is preferably provided at its bottom surface with a mask 280, so as to concentrate the light having the image at the optical sensor while preventing dispersion of the light.

As shown in FIG. 3, the transparent resin of the molding package is subjected at its bottom surface to an etching treatment or a silk treatment such that an area corresponding to a slit is not subjected to the treatment to maintain its original surface while the remaining region is subjected to the treatment so as not to allow light carrying an image to pass therethrough, thereby enabling the light reflected to the bottom surface to be concentrated at the optical sensor 260.

Figure 2:
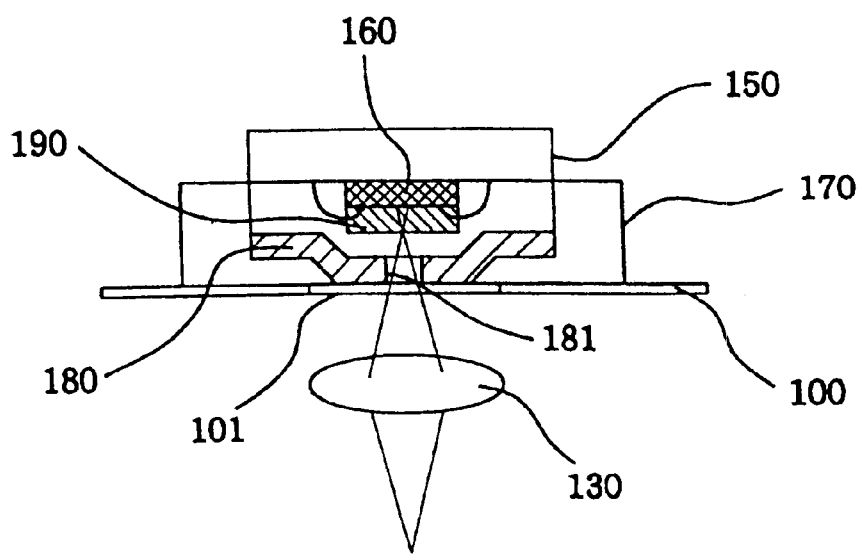
FIG. 2 is a cross-sectional view schematically showing a light-receiving unit of the a conventional optical mouse.

While the conventional light-receiving unit has a complicated arrangement in that an optical sensor is applied with transparent resin and covered with a cap having a slit, as shown in FIG. 2, the arrangement of the invention has a simplified structure resulting from a process of integrating a lead frame and an optical sensor with transparent resin and providing a bottom surface with a slit area and a mask area.

Figure 4:
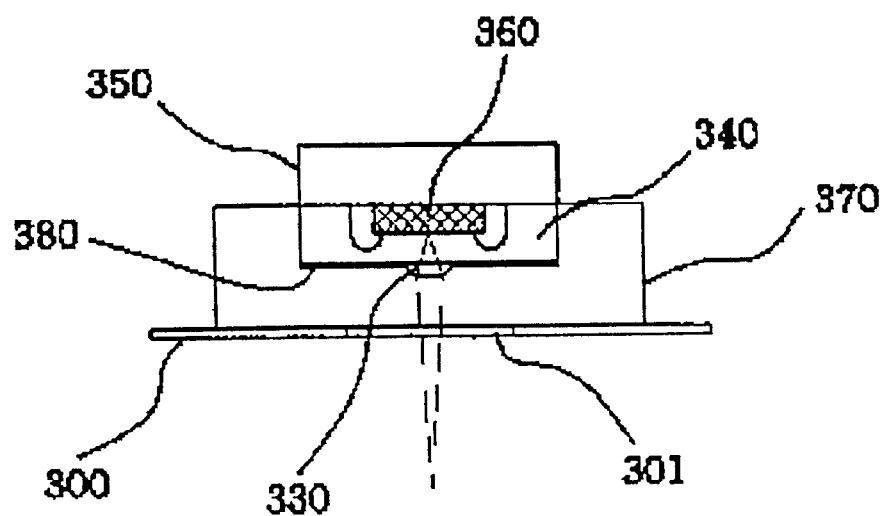
FIG. 4 is a cross-sectional view schematically showing a light-receiving unit according to another embodiment of the present invention.

Referring to FIG. 4, there is shown another embodiment of the present invention. As shown in the drawing, a light-receiving unit according to this embodiment has another arrangement wherein lead frames having an optical sensor bonded thereto are integrally formed with a lens for converging light reflected thereto.

More specifically, an optical sensor 360 is bonded to lead frames 370 by using a wire bonding procedure, and the lead frames and the optical sensor bonded thereto are molded with transparent resin 340, resulting in an integrated molding package 350. Subsequently, the lead frames 370 are electrically connected to a printed circuit board 300 at which a light hole 301 is formed to allow light reflected from an object to be passed therethrough. The molding package 350 is provided at a slit area on its bottom surface with a lens for converging light that carries an image of the object, thereby causing the lens to be involved in the slit area. The lens may be made of a spherical lens or an aspherical lens. Therefore, since this embodiment is capable of integrating the lens with the slit, its structure is more simplified and there is no need for preparing an additional lens. The lens can be replaced by just molding transparent resin to have lens shape, which may be a spherical lens shape or an aspherical lens shape.

In an operation of the light-receiving unit according to this embodiment, light carrying an image formed on a mouse pad reaches the optical sensor 360 through the light hole 301 formed at the printed circuit board 300 and then the slit/lens complex 330. The slit/lens complex 330 serves to converge the light on the optical sensor 360 as well as to allow the light to be passed therethrough. As is the case with the above first embodiment, the transparent resin is treated at its bottom surface by using a masking method resulting in a mask surface such that only the remaining area of the bottom surface, except for the slit/lens complex area 330, can be treated.

According to this embodiment, since the transparent resin is integrally formed with the slit and the lens, there is no need for providing an additional lens. Therefore, the light-receiving unit according to the embodiment has advantages in that cost required to prepare a mold for an additional lens can be saved and its structure can be considerably simplified.

A mouse equipped with the light-receiving unit according to the invention will be operated as follows. Light, which is emitted from a light source and reflected from a mouse pad, is transmitted to an optical sensor through the above light-receiving unit while carrying an image formed on the mouse pad. The image detected at the optical sensor is inputted to a printed circuit board through lead frames where it is converted to an electrical signal, and transmitted to a computer system. Consequently, the computer system recognizes motion of the mouse so that a cursor displayed on a display screen can be moved in accordance with the motion of the mouse. Hence, a user enables the cursor to be moved on the display screen by moving the mouse.

As described above, the present invention provides a light-receiving unit for an optical mouse wherein lead frames and an optical sensor bonded thereto are integrally molded into a molding package. Therefore, the invention has advantages in that structure of the light-receiving unit is simplified by dispensing with a case or a lens which is otherwise to be the light-receiving unit, resulting in improvement of manufacturing efficiency and reduction of manufacturing cost.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A light-receiving unit for an optical mouse, comprising:
    a lens for converging light, which is emitted from a light source and then reflected from a contacting object, in which the light carries an image formed on the contacting object;
    a printed circuit board having a light hole for allowing the light converged by the lens to be passed therethrough; and
    a molding package made by molding lead frames electrically connected to the printed circuit board and an optical sensor bonded to the lead frames and encapsulated with transparent resin, which is adapted to detect the image carried in the converged light.

2. The light-receiving unit for an optical mouse as set forth in claim 1, in which the transparent resin is provided at its bottom surface with a slit area for allowing the converged light to be passed therethrough and a mask area for preventing the converged light from passing therethrough.

3. The light-receiving unit for an optical mouse as set forth in claim 1, in which the lens is a spherical lens or an aspherical lens.

4. An optical mouse having the light-receiving unit of claim 1.

5. An optical mouse having the light-receiving unit of claim 2.

6. An optical mouse having the light-receiving unit of claim 3.

7. A light-receiving unit for an optical mouse, comprising:
    a printed circuit board having a light hole for allowing converged light, which is emitted from a light source and then reflected from a contacting object, to be passed therethrough, in which light carries an image formed on the contacting object;
    a molding package made by molding lead frames electrically connected to the printed circuit board and an optical sensor bonded to the lead frames and encapsulated with transparent resin and adapted to detect the image carried in the converged light,
    wherein the transparent resin is provided at its bottom surface with a slit/lens area for allowing the converged light to be passed therethrough and a mask area for preventing the converged light from passing therethrough.

8. The light-receiving unit for an optical mouse as set forth in claim 7, in which the lens of the slit/lens area is a spherical lens or an aspherical lens.

9. The light-receiving unit for an optical mouse as set forth in claim 7, in which the lens of the slit/lens area is just made of transparent resin to have a spherical lens shape or an aspherical lens shape.

10. An optical mouse having the light-receiving unit of claim 7.

11. An optical mouse having the light-receiving unit of claim 8.

12. An optical mouse having the light-receiving unit of claim 9.

* * * * *